US009662940B2

(12) United States Patent
Vervået et al.

(10) Patent No.: US 9,662,940 B2
(45) Date of Patent: May 30, 2017

(54) TIRE TREAD FOR A FARM TRACTOR

(75) Inventors: Patrick Vervået, Clermont-Ferrand (FR); Benoit Buffetaud, Clermont-Ferrand (FR); Arnaud Larregain, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUES, S.A., Granges-Paccot (CH)

( * ) Notice: Subject to any disclaimer, the term of this patent is extended or adjusted under 35 U.S.C. 154(b) by 743 days.

(21) Appl. No.: 14/119,465

(22) PCT Filed: May 22, 2012

(86) PCT No.: PCT/EP2012/059488
§ 371 (c)(1),
(2), (4) Date: Feb. 3, 2014

(87) PCT Pub. No.: WO2012/160060
PCT Pub. Date: Nov. 29, 2012

(65) Prior Publication Data
US 2014/0196823 A1    Jul. 17, 2014

(30) Foreign Application Priority Data
May 25, 2011 (FR) .................................... 11 54556

(51) Int. Cl.
B60C 11/03    (2006.01)

(52) U.S. Cl.
CPC ....... B60C 11/0311 (2013.04); B60C 11/0302 (2013.04); B60C 2011/0313 (2013.04); B60C 2011/0374 (2013.04); B60C 2200/08 (2013.04)

(58) Field of Classification Search
CPC ............. B60C 2200/08; B60C 11/0311; B60C 11/0302; B60C 2011/0313; B60C 2011/0374
(Continued)

(56) References Cited

U.S. PATENT DOCUMENTS 3,237,669 A * 3/1966 Travers ............... B60C 11/0311
152/209.13
3,603,370 A * 9/1971 Hylbert ............... B60C 11/0311
152/209.12
(Continued)

FOREIGN PATENT DOCUMENTS

DE   1809540 A1 * 8/1969 .......... B60C 11/0311
EP   0795427 A1   9/1997
(Continued)

OTHER PUBLICATIONS

English Abstract for foreign publication DE 1809540; Roto Werke; printed on Aug. 2, 2016.*
(Continued)

*Primary Examiner* — Seyed Masoud Malekzadeh
(74) *Attorney, Agent, or Firm* — Dickinson Wright PLLC

(57) ABSTRACT

Tire and tread for a vehicle for agricultural use having reduced attack to leading faces of tread bars, at axially outer ends thereof, by stubble remaining after harvest, thereby reducing risk of chunking of axially outer ends of the bars. The tire and tread has a plurality of bars, a bar having, in any axial plane ($P_{xy}$) parallel to the axis of rotation, a leading profile and a trailing profile. The angle (A) of the straight line (T) tangential to the leading profile at a point (M) on the leading profile, with respect to an equatorial plane (P), increases continuously, from an axially outermost point (E) of the leading profile, when the axial distance (L) between the point (M) and the point (E) increases, the angle (A) reaches a maximum value ($A_m$) at a point of inflection (I) of
(Continued)

the leading profile, and the radius of curvature (R) at any point (M), positioned axially between the axially outermost point (E) and the point of inflection (I), is at least equal to 0.4 times the height of the bar.

9 Claims, 5 Drawing Sheets

(58) Field of Classification Search
USPC .................................................... 152/209.12
See application file for complete search history.

(56) References Cited

U.S. PATENT DOCUMENTS

| | | | |
|---|---|---|---|
| 4,131,148 A | 12/1978 | Bertazzoli et al. | |
| 4,186,788 A * | 2/1980 | Pommier | B60C 11/1315 |
| | | | 152/209.12 |
| 4,383,567 A * | 5/1983 | Crum | B60C 11/0311 |
| | | | 152/209.12 |
| 4,446,902 A | 5/1984 | Madec et al. | |
| 4,611,647 A | 9/1986 | Rimondi | |
| 5,010,935 A | 4/1991 | Bonko et al. | |
| 5,056,573 A * | 10/1991 | O'Brien | B60C 11/0311 |
| | | | 152/209.12 |
| 5,337,814 A * | 8/1994 | Bonko | B60C 11/0311 |
| | | | 152/209.12 |
| 5,411,067 A * | 5/1995 | Beeghly | B60C 9/08 |
| | | | 152/209.12 |
| 5,901,765 A * | 5/1999 | Bonko | B60C 11/0311 |
| | | | 152/209.12 |
| 6,062,282 A * | 5/2000 | Bonko | B60C 11/0304 |
| | | | 152/209.12 |
| 6,179,027 B1 * | 1/2001 | Shimizu | B60C 11/0316 |
| | | | 152/209.12 |
| 6,263,933 B1 * | 7/2001 | Baus | B60C 11/0311 |
| | | | 152/209.12 |
| 6,450,221 B1 * | 9/2002 | Bonko | B60C 11/0311 |
| | | | 152/209.12 |
| 2004/0099359 A1 * | 5/2004 | Bonko | B60C 11/033 |
| | | | 152/209.12 |
| 2005/0133141 A1 * | 6/2005 | Neubauer | B60C 11/0311 |
| | | | 152/558 |
| 2007/0137758 A1 * | 6/2007 | Rielly | B60C 9/08 |
| | | | 152/554 |

FOREIGN PATENT DOCUMENTS

| | | |
|---|---|---|
| EP | 09032249 A1 | 3/1999 |
| EP | 1831034 A1 | 9/2007 |
| JP | H11115417 A | 4/1999 |

OTHER PUBLICATIONS

PCT/EP2012/059488—International Search Report (English translation included), dated Aug. 10, 2012, 3 pages.

\* cited by examiner

TIRE TREAD FOR A FARM TRACTOR

This application claims benefit of the filing date of PCT/EP2012/059488, filed May 22, 2012, which claims the benefit of FR1154556, filed May 25, 2011, the entire contents of each of which are incorporated herein by reference for all purposes.

BACKGROUND

1. Field

The present invention relates to a tire for a vehicle for agricultural use, such as an agricultural tractor or an agri-industrial vehicle.

It relates more particularly to the tread of such a tire, which is intended to come into contact with the ground via a tread surface.

2. Description of Related Art

In what follows, the circumferential, axial and radial directions respectively denote: a direction tangential to the tread surface of the tire and oriented in the direction of rotation of the tire; a direction parallel to the axis of rotation of the tire; and a direction perpendicular to the axis of rotation of the tire. The equatorial plane of the tire is the plane passing through the middle of the tread of the tire and perpendicular to the axis of rotation of the tire. An axial plane is a plane parallel to the axis of rotation of the tire: it is defined by the circumferential and axial directions.

A tire for an agricultural tractor is intended to be driven on various tires of ground such as the more or less compacted earth of the fields, unmetalled farm tracks providing access to the fields, and asphalt road surfaces. Bearing in mind the diversity of use, in the field and on road, a tire for an agricultural tractor and, in particular the tread thereof, has to exhibit a compromise in performance between traction in the field, resistance to chunking, resistance to wear on road, rolling resistance and on-road vibrational comfort.

In order to meet all these performance criteria, the tread of a tire for an agricultural tractor generally comprises a plurality of bars. The bars are elements that are raised relative to a base surface of the tread, of revolution about the axis of rotation of the tire, and extending radially as far as the tread surface.

A bar generally has an elongate parallelepipedal overall shape made up of at least one straight or curved portion, and is separated from the adjacent bars by furrows. A bar may be made up of a succession of straight portions, as described in documents U.S. Pat. No. 3,603,370, U.S. Pat. No. 4,383,567, EP 795 427 or may have a curved shape, as set out in documents U.S. Pat. No. 4,446,902, EP 903 249, EP 1 831 034.

In the radial direction, a bar extends from the base surface as far as the tread surface, the radial distance between the base surface and the tread surface defining the height of the bar. The radially outer face of the bar, belonging to the tread surface, which comes into contact with the ground as the bar passes through the contact patch, is referred to as the contact face of the bar.

In the axial direction, a bar extends inwards from an axial end of the tread. In general, a bar extends axially inwards from an axially outer end face as far as an axially inner end face closer to the equatorial plane of the tire.

In the circumferential direction, a bar extends, in a preferred direction of rotation of the tire, between a leading face and a trailing face. The preferred direction of rotation means the direction of rotation recommended by the manufacturer of the tire for optimum use of the tire. By way of example, in the case of a tread comprising two rows of bars in a V-shape or chevron configuration, the tire has a preferred direction of rotation according to the points of the chevrons. By definition, the leading face is the face the radially outer edge corner or leading edge corner of which is first to come into contact with the ground, as the bar passes through the contact patch, as the tire rotates. The trailing face is, by definition, the face the radially outer edge corner or trailing edge corner of which is last to come into contact with the ground, as the bar passes through the contact patch, as the tire rotates. According to the direction of rotation, the leading face is said to lead the trailing face.

The leading and trailing faces of a bar can be described in terms of the curves of intersection of the bar with an axial plane parallel to the axis of rotation of the tire and intersecting the bar. A bar thus, in any axial plane, comprises a leading profile, which is the intersection of the leading face and of the axial plane, and a trailing profile, which is the intersection of the trailing face and of the axial plane. The definition of the leading and trailing profiles, in any axial plane intersecting the bar and comprised between the base surface and the tread surface, defines the leading and trailing faces.

A bar usually has a mean angle of inclination with respect to the circumferential direction of close to 45°, the mean angle of inclination being the angle of the straight line passing through the axial ends of the bar. Specifically, this mean angle of inclination in particular allows a compromise between traction in the field and vibrational comfort. Traction in the field is all the better the more radial the bar is, i.e. the closer its mean angle of inclination is to 90°, whereas vibrational comfort is better the more longitudinal the bar is, i.e., the closer its mean angle of inclination is to 0°. It is a well-known fact that traction in the field is determined more by the angle of the bar in the shoulder region, and this has lead certain tire designers to propose a highly curved bar shape leading to a bar that is substantially radial at the shoulder and substantially longitudinal in the middle of the tread.

The tread of a tire for an agricultural tractor usually comprises two rows of bars as described hereinabove. This distribution of bars which are inclined with respect to the circumferential direction, gives the tread a V-shape commonly referred to as a chevron pattern. The two rows of bars exhibit symmetry with respect to the equatorial plane of the tire, usually with a circumferential offset between the two rows of bars, resulting from a rotation of one half of the tread about the axis of the tire with respect to the other half of the tread. Further, the bars may be continuous or discontinuous, and may be distributed circumferentially with a spacing that is constant or variable.

Various designs of bar tread have been proposed, depending on the desired improvement in performance, as shown by way of example by the documents mentioned hereinafter. Document U.S. Pat. No. 4,131,148 offers a base surface that is faceted to improve traction in the field and self-clearing of the tread. Document U.S. Pat. No. 4,611,647 offers a bar with a leading face of which the circumferential profile, in a circumferential plane parallel to the equatorial plane, is convex and curved, in order to improve resistance to wear, effectiveness and life. Document U.S. Pat. No. 5,010,935 describes a bar of which the leading face has a concave circumferential profile with a double slope, for better traction in the field and better resistance to the chunking. Document JP 11115417 describes a bar the leading face of which has a convex circumferential profile with a double slope to improve traction in the field and self-clearing of the tread.

However, conventional bar treads may be sensitive to a particular form of attack: attack by stubble remaining in the fields after harvest. Stubble is a portion of the stem of the plant the free end of which is sharp. The sharp free end of stubble, which comes into contact with the leading face of a bar, perforates it locally and superficially, leading to local chunking of the elastomer-based polymer or elastomer material of which the bar is made. Repeated attacks on the leading faces of the bars by stubble may cause severe deterioration to the appearance of the bars, or may even cause chunking particularly at the axially outer ends of the bars. This damage is likely to lead to complaints by the users and to the tire being replaced.

SUMMARY

It is an objective of the present invention to reduce the attack to the leading faces of the tread bars of a tire for agricultural use, at the axially outer ends thereof, by stubble that remains after harvest, and in that way to reduce the risk of chunking of the axially outer ends of the bars.

This objective has been achieved according to the invention by a tire for a vehicle for agricultural use, comprising:
  a tread comprising a plurality of bars,
  a bar extending radially outwards from a base surface of the tread over a bar height, axially towards the inside from an axial end of the tread and circumferentially, in a preferred direction of rotation of the tire, between a leading face and a trailing face,
  a bar comprising, in any axial plane parallel to the axis of rotation of the tire, a leading profile, the intersection of the leading face and of the axial plane, and a trailing profile, the intersection of the trailing face and of the axial plane,
the angle of the straight line tangential to the leading profile at a point on the leading profile, with respect to an equatorial plane of the tire passing through the middle of the tread, increasing continuously from an axially outermost point of the leading profile, when the axial distance between the point of the leading profile and the axially outermost point of the leading profile increases, the angle reaching a maximum value at a point of inflection of the leading profile, and the radius of curvature at any point on the leading profile, positioned axially between the axially outermost point and the point of inflection, being at least equal to 0.4 times the height of the bar.

The invention is essentially based on the shape of the axially outer leading face portion of the bar. The axially outer leading face portion is described by the leading profile in an axial plane intersecting the bar. The axial plane considered is positioned radially between the base surface and the tread surface and radially on the outside of the surface connecting the leading face to the base surface.

According to the invention, the angle of the straight line tangential to the leading profile at a point on the leading profile, with respect to an equatorial plane of the tire passing through the middle of the tread, increases continuously, from an axially outermost point of the leading profile, when the axial distance between the point on the leading profile and the axially outermost point of the leading profile increases. In other words, at the axially outermost point of the leading profile, i.e., the point positioned axially on the axially outer end of the bar, the straight line tangential to the leading profile has a minimum value of close to 0°. The angle of the straight line tangential to the leading profile is measured with respect to the equatorial plane, or with respect to the circumferential direction, the equatorial plane being by definition the circumferential plane that passes through the middle of the tread. The angle of the straight line tangential to the leading profile will then increase continuously at any point on the leading profile until it reaches a maximum value at a point on the leading profile referred to as the point of inflection, where the curvature of the leading profile reverses. Finally, axially on the inside of this point of inflection, the angle of the tangential straight line will decrease progressively.

Considering this in terms of curvature, the leading profile portion comprised between the axially outermost point and the point of inflection is convex, i.e. the centre of curvature at any point is positioned behind the leading profile, on the trailing profile side, and the curvature is of constant sign. The curvature cancels at the point of inflection I. Axially on the inside of the point I, the centre of curvature at a point on the leading profile is positioned forward of the leading profile, on the opposite side to the trailing profile, and the curvature is of opposite sign: the leading profile portion axially on the inside of the point of inflection is said to be concave. In an extreme case, the curvature in the leading profile portion axially on the inside of the point of inflection may be zero, and this corresponds to a leading profile portion that is straight.

Because the shape of the leading profile, in a given axial plane, is similar in any axial plane intersecting the bar, the leading face comprises, in the axial direction, on each side of a dividing line, elemental surfaces which have curvatures, in an axial plane, of opposite sign.

Another essential feature of the invention is that the radius of curvature at any point on the leading profile, positioned axially between the axially outermost point and the point of inflection, is at least equal to 0.4 times the height of the bar. The height of the bar is the mean radial distance measured between the base surface of the tread and the radially outermost face of the bar, belonging to the tread surface. This feature guarantees minimum convexity avoiding having a radius of curvature which is too small and locally leads to a discontinuity of the tangent, and therefore to an angular point. In other words, the inventors are seeking to avoid having a sharp edge corner at the axially outer end of the leading face.

The convex shape of the leading face of the bar, at its axially outer end, advantageously allows the sharp and aggressive end of any stubble impacting in this zone to be deflected axially outwards and removed towards the outside of the tread. This deflection of the stubble ends prevents this stubble from perforating the elastomeric compound of the bar, ensuring that said material remains intact in this bar end zone and therefore ensuring the mechanical integrity of the end of the bar. A minimum radius of curvature of the bar, proportional to the height of the bar, is needed in order to avoid any unwanted blockage of the end of the stubble by a sharp edge corner, i.e. by a connection region that has no fillet radius or that has a fillet radius with a small radius of curvature, for example smaller than 3 mm.

Another advantage of the invention is that it allows better removal of the soil contained in the furrows separating two bars, thanks to the convex shape free of sharp edges of the axially outer end of the bar which makes it easier for soil to flow axially towards the outside of the tread.

It is also advantageous for the axial distance between the point of inflection of the leading profile and the equatorial plane of the tire to be at least equal to 0.8 times the axial distance between the axially outermost point of the leading profile and the equatorial plane of the tire. This is because it is only from a certain axial distance from the equatorial plane onwards that the attack on the leading face of a bar by the end of stubble is essentially damaging. Below this value, a convex shape for the leading profile is of no benefit because it is too far away from the axially outer end of the bar. Moreover, an axial distance shorter than this value would be likely to weaken the bar mechanically and make it more sensitive to chunking.

The axial distance between the point of inflection of the leading profile and the equatorial plane of the tire is even more advantageously at most equal to 0.95 times the axial distance between the axially outermost point of the leading profile and the equatorial plane of the tire. Beyond this maximum axial distance, the axial length of the leading profile convex portion is insufficient to guarantee to protect the axially outer end of the bar because the number of stubble ends that are deflected and removed is not high enough to achieve a significant reduction in the amount of attack suffered by the axially outer end of the bar.

According to one advantageous embodiment, the circumferential distance between the axially outermost point of the leading profile and the trailing profile is at most equal to 0.5 times the distance between the point of inflection of the leading profile and the trailing profile, measured perpendicular to the trailing profile. The circumferential distance between the axially outermost point of the leading profile and the trailing profile, which distance is measured in the circumferential direction, defines the thickness at the axially outer end of the bar. The distance between the point of inflection of the leading profile and the trailing profile, measured perpendicular to the trailing profile, defines the thickness of the bar at the point of inflection. Usually, the thickness of the bar at the point of inflection varies fairly little for the points axially on the inside of the point of inflection: the thickness of the bar is substantially constant. A thickness at the axially outer end of the bar implies that there is a bar axially outer end face and guarantees flexural rigidity of the axially outer end of the bar. A thickness at the axially outer end of the bar having a maximum value simultaneously guarantees that the end of the stubble will be deflected and that the axially outer end of the bar will have mechanical rigidity. In the extreme case where the distance between the axially outermost point of the leading profile and the trailing profile is zero, the axially outer end face of the bar no longer exists and the leading face is connected directly to the trailing face at the axially outer end of the bar.

The angle of the straight line tangential to the leading profile at the axially outermost point of the leading profile, with respect to the equatorial plane of the tire, is advantageously at most equal to 5°. The result of this is that the straight line tangential to the leading profile at this point is almost circumferential and, as a result, is in the plane of the axially outer end face of the bar. This guarantees that the leading face and the axially outer end face of the bar connect to one another progressively and without any sharp edge corners.

According to another advantageous embodiment, the angle of the straight line tangential to the leading profile at the point of inflection of the leading profile, with respect to the equatorial plane of the tire, is at least equal to 40°, preferably at least equal to 45°. Below this minimum value, the mean direction of the bar is too close to the circumferential direction at the axially outer end of the bar, and this impairs the usual performance of the bar.

It is also advantageous for the angle of the straight line tangential to the leading profile at the point of inflection of the leading profile, with respect to the equatorial plane of the tire, to be at most equal to 75°, preferably at most equal to 55°. Beyond this maximum value, there is a risk that the ends of the stubble will become blocked through insufficient inclination of the bar.

It is finally advantageous for the leading face to be connected to the base surface by a connection that is continuous and tangential to the base surface. This feature makes it possible to avoid any sharp edges at the root of the bar, including at the axially outer end of the bar, which sharp edges could impede the deflection of the end of the stubble.

A tire tread comprising a plurality of bars, made up of a first and of a second row of bars which are arranged in a chevron pattern with respect to the equatorial plane of the tire, is advantageously configured according to the features of the invention described hereinabove.

BRIEF DESCRIPTION OF THE DRAWINGS

The present invention will be better understood with the aid of FIGS. 1 to 5 introduced hereinafter.

DETAILED DESCRIPTION OF SPECIFIC EMBODIMENTS

Figure 1:
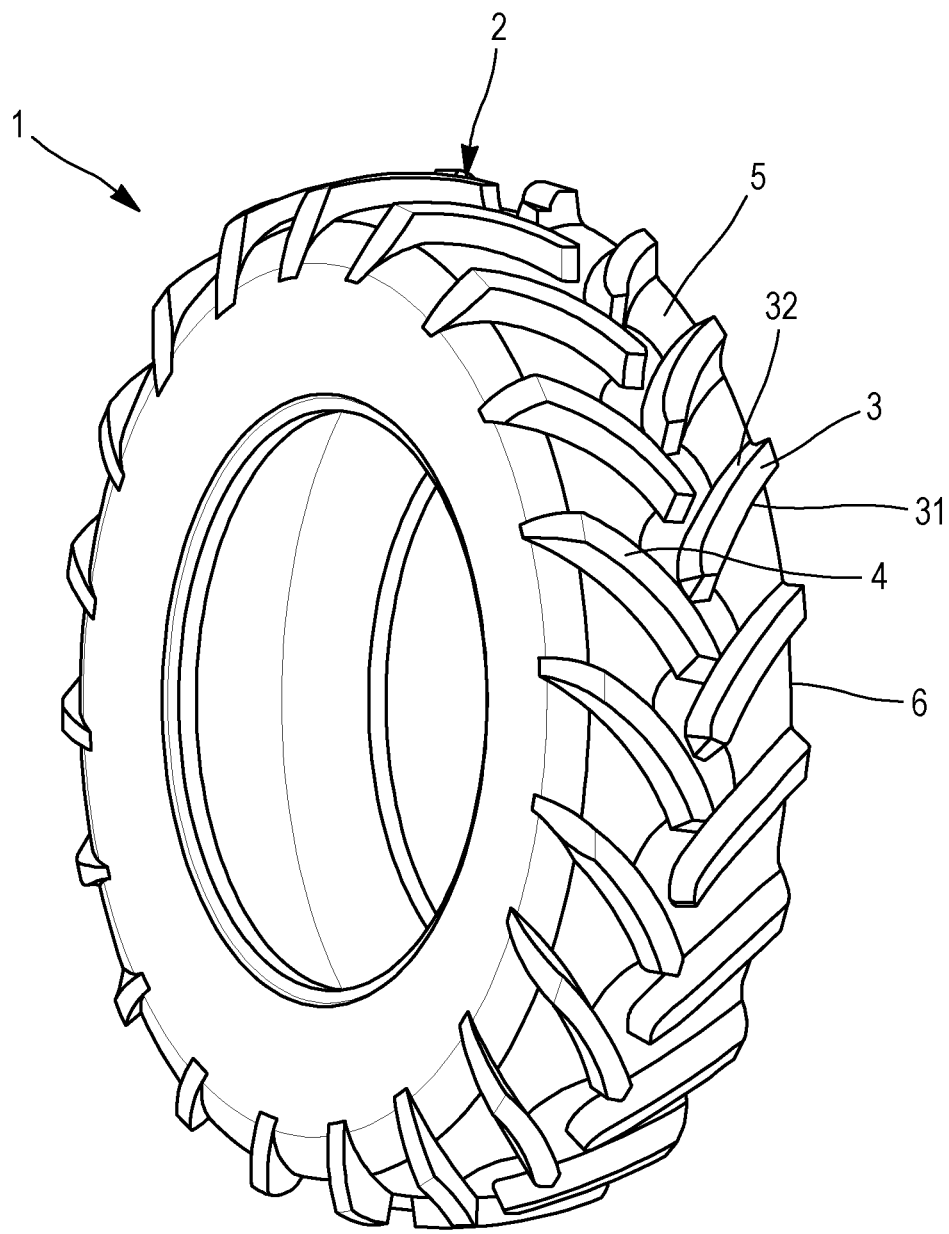
FIG. 1 shows a perspective view of a tire according to the invention.

FIG. 1 shows a perspective view of a tire 1 according to the invention. The tread 2 of the tire comprises a plurality of bars (3, 4). In this particular instance, the plurality of bars is distributed in a first row of bars 3 and a second row of bars 4, these being symmetric with respect to the equatorial plane of the tire and arranged in a chevron pattern. A bar (3, 4) extends radially outwards from a base surface 5 of the tread 2, of revolution about the axis of rotation of the tire, over a bar height. The bar 3 extends axially towards the inside from an axial end 6 of the tread 2. The bar 3 extends circumferentially, in a preferred direction of rotation of the tire 1, from a leading face 31 to a trailing face 32. In the tire depicted in FIG. 1, the preferred direction of rotation is indicated by the points of the chevron patterns in which the bars are arranged.

Figure 2:
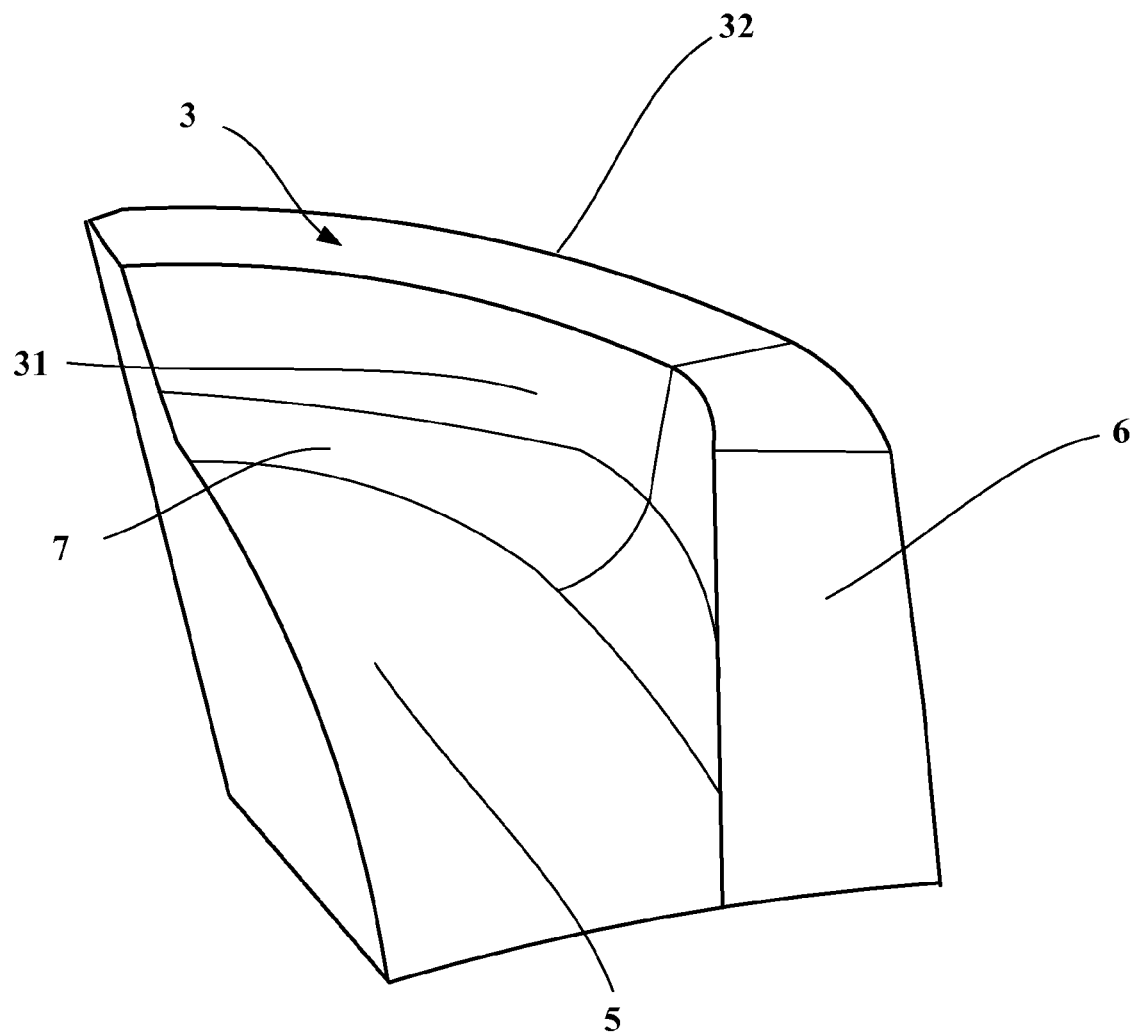
FIG. 2 shows a perspective view of an axially outer end of a bar of a reference tire.

FIG. 2 shows a perspective view of an axially outer end of a bar of a conventional reference tire. The bar 3 comprises a leading face 31, a trailing face 32 and an axially outer face at the axial end 6 of the tread. The bar 3 extends radially outwards from a base surface 5 of the tread. The leading face 31 is connected to the base surface 5 by a connecting surface 7 comprising a fillet radius. In the reference tire, the leading face 31 is connected to the axial end 6 by a sharp edge corner, characterized by a very small blend radius, for example of the order of 1 to 3 mm. The leading face, shown in FIG. 2, has a concave curved shape, i.e. the centre of curvature of the leading profile, which is the intersection of the leading face with an axial plane, at a given point on the leading profile, is forward of the leading face 31, on the opposite side to the trailing face 32. In this configuration, it is difficult for the end of some stubble to be removed towards the outside of the tread.

Figure 3:
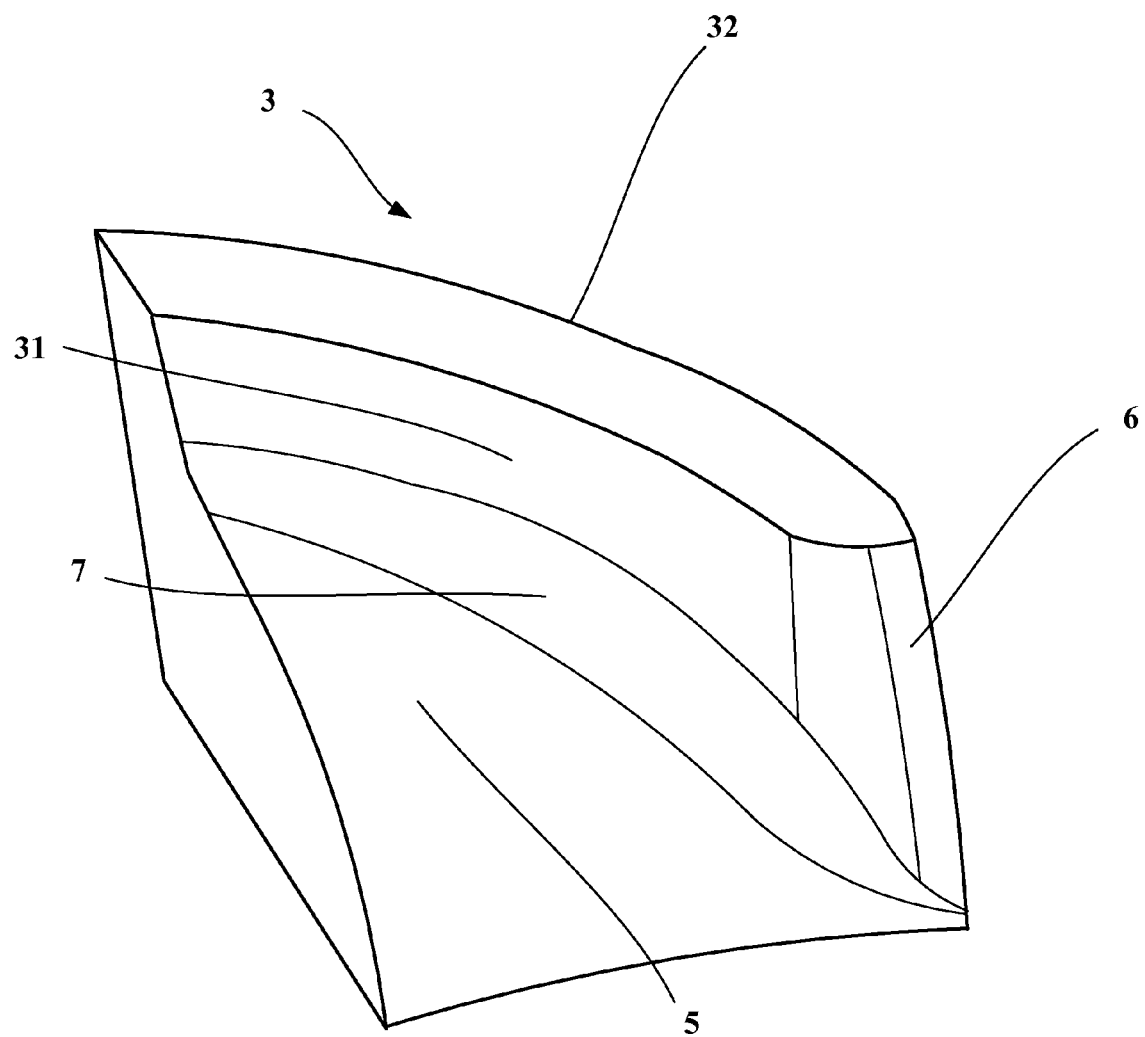
FIG. 3 shows a perspective view of an axially outer end of a bar of a tire according to the invention.

FIG. 3 shows a perspective view of an axially outer end of the bar of a tire according to the invention. From the axially outer end 6 of the bar, the leading face 31 is convex, with a centre of curvature positioned behind the leading face 31, on the trailing face 32 side, and then, following a reversal of curvature, becomes at least partially concave, with a centre of curvature positioned forward of the leading face 31, on the opposite side to the trailing face 32. The connection between the leading face 31 and the axial end 6 occurs without sharp edges. Likewise, the connection between the leading face 31 and the base surface 5 is via a connecting surface 7 that has no sharp edges. The absence of any sharp edges at the axially outer end of the bar prevents any stubble ends from becoming trapped in this zone.

Figure 4:
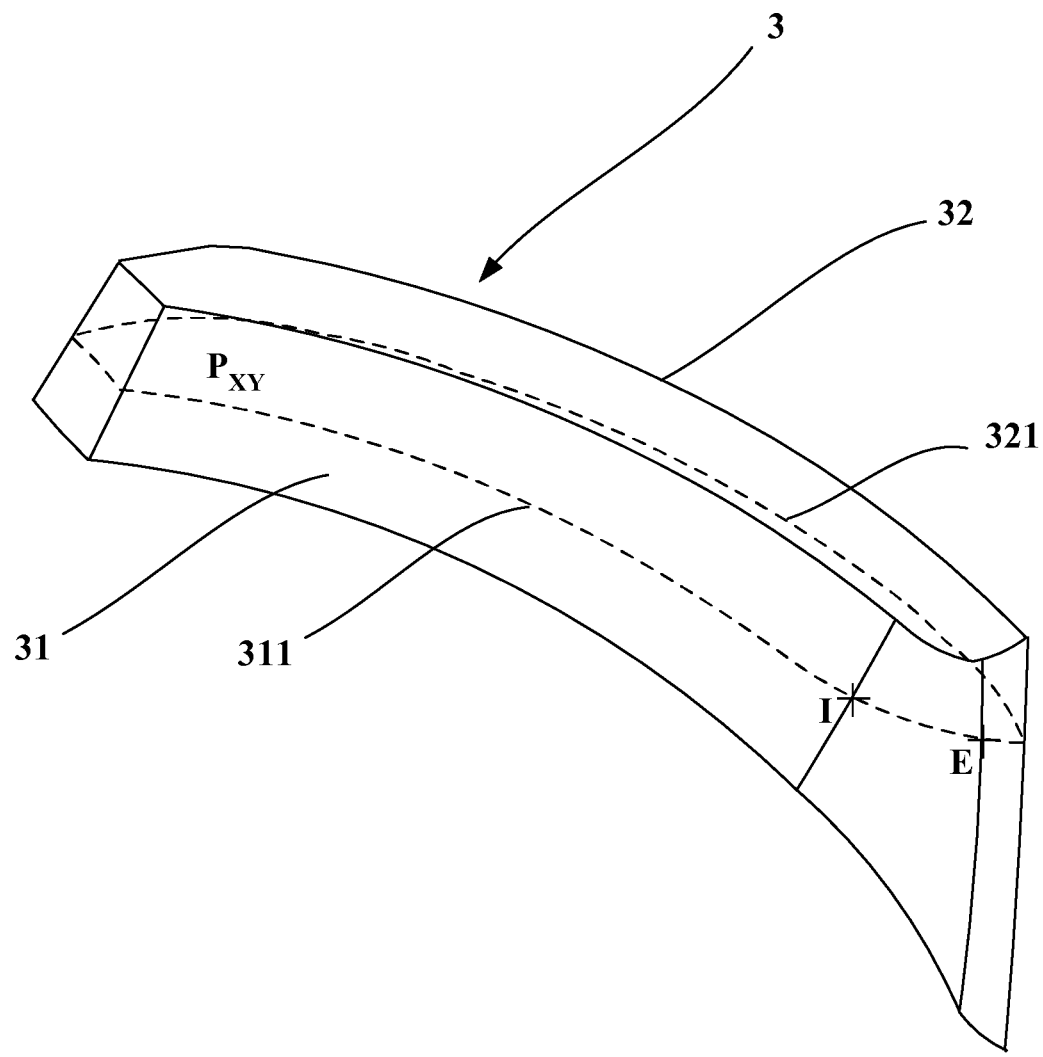
FIG. 4 shows a perspective view of a bar of a tire according to the invention.

FIG. 4 shows a perspective view of a bar 3 of a tire according to the invention, with its leading 31 and trailing 32 faces. An axial cross section through the bar 3 on an axial plane $P_{xy}$ parallel to the axis of rotation of the tire is shown in dotted line. The leading profile 311 is defined by the intersection of the leading face 31 with the axial plane $P_{xy}$. The trailing profile 321 is defined by the intersection of the trailing face 32 with the axial plane $P_{xy}$. The points E and I are respectively the axially outermost point and the point of inflection of the leading profile 311.

Figure 5:
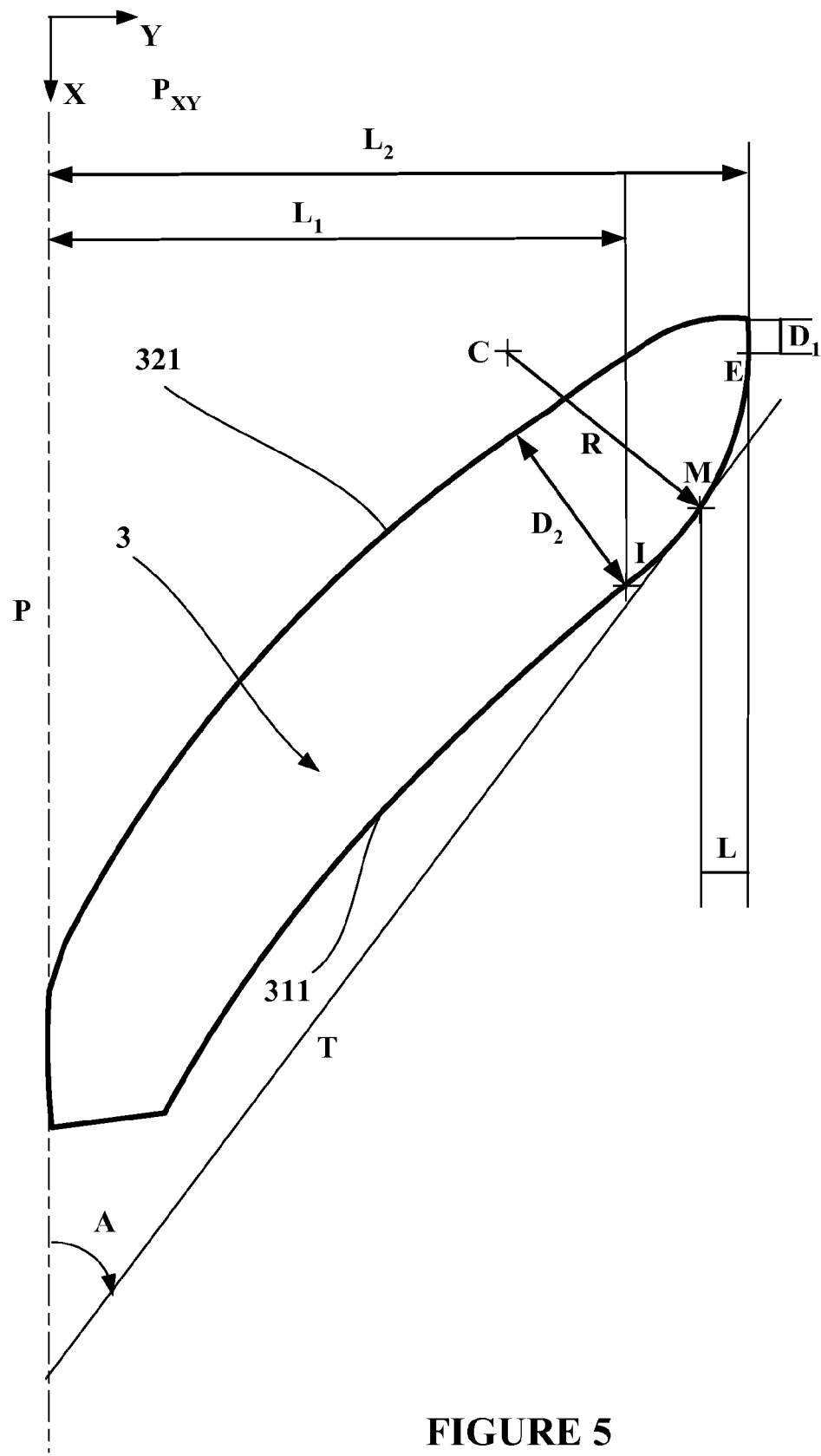
FIG. 5 shows a section in an axial plane of a bar of a tire according to the invention.

FIG. 5 shows a cross section in an axial plane $P_{xy}$ of a bar of a tire according to the invention. In the circumferential direction X, the bar 3 extends between the leading profile 311 and the trailing profile 321. In the axial direction Y, the leading profile 311 comprises, near the axially outer end of the bar, an axially outermost point E positioned at an axial distance $L_2$ away from the equatorial plane P of the tire, and a point of inflection I positioned at an axial distance $L_1$ away from the equatorial plane P of the tire. At any point M positioned axially between the point E and I, the tangent T to the leading profile 311 makes an angle A with respect to the equatorial plane P. The angle A of the tangent T increases continuously when the axial distance L from the point M to the axially outermost point E increases. The curvature at any point M positioned axially between the points E and I is defined by the centre of curvature C and the radius of curvature R. According to the invention, the curvature at any point M is convex, i.e. is such that the centre of curvature is positioned circumferentially behind the leading profile 311, on the trailing profile 321 side. At the point of inflection I, the curvature at the leading profile 311 cancels and changes direction at any point axially inside the point of inflection I, the centre of curvature then being positioned circumferentially forward of the leading profile 311, on the opposite side to the trailing profile 321.

The invention has been developed more particularly for an agricultural tire of size 520/85 R 42. For this under sized study, in a given axial plane, the axial distance of the point of inflection of a leading profile with respect to the equatorial plane of the tire is comprises between 0.8 times and 0.95 times the axial distance of the axially outermost point with respect to the equatorial plane of the tire. The radius of curvature at a point positioned axially between the axially outermost point and the point of inflection is at least equal to 24 mm, and therefore to 0.4 times the height of the bar, this height being equal to 60 mm.

In order to quantify the technical effectiveness of the invention, the inventors have compared the mean number of impacts, caused by the ends of stubble in the convex axially outer portion of the leading face of a bar, on several bars, between a reference tire and a tire according to the invention. They observed a 30% improvement in terms of the mean number of impacts for the tire according to the invention as compared with the reference tire.

The principle of a reversal of curvature in the vicinity of the axially outer end of the bar can be extended to the trailing face of a bar.

The present invention can be extended to treads comprising more than two rows of bars.

The invention may also prove to be a technical solution to any problem of a bar being attacked by any indenter behaving in a similar way to stubble, i.e. an indenter having mobility in rotation about a fixed end anchored in the ground, a sharp and aggressive free end, and sufficient axial rigidity to be able to perforate the elastomeric compound of the bar.

The invention can finally be generalized to any tire the tread of which comprises raised elements and which is liable to run on ground comprising aggressive indenters, such as a tire for a construction plant vehicle.

The invention claimed is:

1. A tire for a vehicle for agricultural use, comprising:
   a tread comprising a plurality of bars,
   at least one of said plurality of bars extending radially outwards from a base surface of the tread over a bar height (H), axially towards an inside from an axial end of the tread and circumferentially, in one rotational direction of the tire, between a leading face and a trailing face,
   at least one of the plurality of bars comprising, in an axial plane ($P_{xy}$) parallel to an axis of rotation of the tire, a leading profile, an intersection of the leading face and of the axial plane ($P_{xy}$), and a trailing profile, the intersection of the trailing face and of the axial plane ($P_{xy}$),
   wherein an angle (A) of a straight line (T) tangential to the leading profile at a point (M) on the leading profile, with respect to an equatorial plane (P) of the tire passing through a middle of the tread, increases continuously from an axially outermost point (E) of the leading profile to a point of inflection (I) of the leading profile, when an axial distance (L) between the point (M) of the leading profile and the axially outermost point (E) of the leading profile increases, in that the angle (A) reaches a maximum value ($A_m$) at the point of inflection (I) of the leading profile, and in that a radius of curvature (R), at any point on the leading profile positioned axially between the axially outermost point (E) and the point of inflection (I), is at least equal to 0.4 times the bar height (H).

2. A tire according to claim 1, wherein an axial distance (L1) between the point of inflection (I) of the leading profile and the equatorial plane (P) of the tire is at least equal to 0.8 times an axial distance (L2) between the axially outermost point (E) of the leading profile and the equatorial plane (P) of the tire.

3. A tire according to claim 1, wherein an axial distance ($L_1$) between the point of inflection (I) of the leading profile and the equatorial plane (P) of the tire is at most equal to 0.93 times the axial distance ($L_2$) between the axially outermost point (E) of the leading profile and the equatorial plane (P) of the tire.

4. A tire according to claim 1, wherein a circumferential distance (D1) between the axially outermost point (E) of the leading profile and the trailing profile is at most equal to 0.5 times a distance (D2) between the point of inflection (I) of the leading profile and the trailing profile, measured perpendicular to the trailing profile.

5. A tire according to claim 1, wherein the angle (A) of the straight line (T) tangential to the leading profile at the axially outermost point (E) of the leading profile, with respect to the equatorial plane (P) of the tire, is at most equal to 5°.

6. A tire according to claim 1, wherein the angle (A) of the straight line (T) tangential to the leading profile at the point of inflection (I) of the leading profile, with respect to the equatorial plane (P) of the tire, is at least equal to 40°.

7. A tire according to claim 1, wherein the angle (A) of the straight line (T) tangential to the leading profile at the point of inflection (I) of the leading profile, with respect to the equatorial plane (P) of the tire, is at most equal to 75°.

8. A tire according to claim 1, wherein the leading face is connected to the base surface by a connection that is continuous and tangential to the base surface.

9. A tire according to claim 1, wherein the plurality of bars is made up of a first and of a second row of bars which are arranged in a chevron pattern with respect to the equatorial plane (P) of the tire.

* * * * *